United States Patent [19]
Morrison et al.

[11] 4,088,552
[45] May 9, 1978

[54] RECOVERING SILVER COMPOUNDS FROM SOLUTIONS CONTAINING OTHER SILVER COMPOUNDS

[75] Inventors: Edward Dixon Morrison; Chen-i Lu, both of Rochester, N.Y.

[73] Assignee: Eastman Kodak Company, Rochester, N.Y.

[21] Appl. No.: 678,338

[22] Filed: Apr. 19, 1976

[51] Int. Cl.² ............................................. B01J 1/10
[52] U.S. Cl. ..................... 204/157.1 R; 204/157.1 H; 96/50 A
[58] Field of Search ................ 204/157.1 H, 157.1 R; 250/527; 96/61 R, 50 A

[56] References Cited
U.S. PATENT DOCUMENTS

| | | | |
|---|---|---|---|
| 2,221,163 | 11/1940 | Barnes et al. | 423/43 |
| 2,940,828 | 6/1960 | Moede | 204/157.1 R |
| 3,554,887 | 1/1971 | Feehs | 250/527 |
| 3,786,250 | 1/1974 | Huhn | 204/157.1 R |

OTHER PUBLICATIONS

Mason, Photographic Processing Chemistry, 1975, pp. 196 and 197.

Primary Examiner—Howard S. Williams
Attorney, Agent, or Firm—T. N. Dahl

[57] ABSTRACT

Silver in compound form, usually silver sulfide, is precipitated from a solution containing other silver compounds, such as the complex silver thiosulfate compounds in photographic fix and bleach-fix solutions, by subjecting such a solution to radiation having an energy level of at least 4 electronvolts. The solution as received, or diluted only with water, is irradiated without adding other chemicals such as acid or alkaline compounds to change the normal pH. Ultraviolet light and high energy electrons are preferred. Penetration of the UV light or high energy electrons is improved by recycling a flowing stream and/or agitating solution.

5 Claims, 10 Drawing Figures

RECOVERING SILVER COMPOUNDS FROM SOLUTIONS CONTAINING OTHER SILVER COMPOUNDS

BACKGROUND OF THE INVENTION

1. Field of the Invention

This invention is an apparatus and process for recovering silver in the form of a silver compound precipitate from certain silver compound-containing solutions, and more particularly to a process for recovering silver in the form of silver sulfide from aqueous photographic solutions such as spent thiosulfate photographic fix and bleach-fix solutions containing soluble silver complexes with thiosulfate, and wash water solutions resulting from washing fixed photographic film during processing (containing as little as 0.01 gram of $Ag^+$ per 1000 ml). The process is also applicable to recovering silver from other types of solutions such as wash waters from silver nitrate manufacture and photographic emulsion manufacture (containing silver halide), but a thiosulfate compound or other soluble sulfur compound should be added to provide sulfur ions.

2. The Prior Art

U.S. Pat. No. 2,221,163 describes the recovery of silver from waste photographic fix treatment with a guanidine salt or quaternary ammonium compound, along with a base such as sodium or potassium hydroxide to raise the pH to a high value, thus causing silver sulfide to precipitate. The reaction is said to be helped by briefly irradiating the treated fix with ultraviolet light. Waste photographic fix and bleach-fix solutions normally give a pH ranging from 4 to 9, and rapid and complete precipitation with a guanidine salt or quaternary ammonium compound in accordance with the patent allegedly will only occur if enough alkali is added to increase the pH to a value of 10 to 11. A process which does not require chemical additions would be simpler and less expensive, and would be less apt to have a detrimental effect on the ecology when the stripped solution is finally discharged.

SUMMARY OF THE INVENTION

We have found, surprisingly, that by irradiating certain silver compound-containing aqueous solutions having pH between about 4 and about 9 with radiation having an energy level of 4 ev (electronvolts) or above, silver in the form of a silver salt compound is thereby precipitated without adding any alkaline or acid chemical compound to change the pH from the normal approximately neutral pH of the solution of about 4 to 9, allowing easy recovery of the silver salt. Such a process is simpler and less expensive than one requiring chemical addition, and is less apt to affect the ecology adversely when the stripped solution is finally discharged.

Among the types of radiation which may be used are high energy electrons; and electromagnetic radiant energy having wavelengths less than 375 nanometers (nm) such as high intensity ultraviolet light (desirably at least 30% in the UV range), X-rays, and gamma rays. Ultraviolet light and high energy electrons are preferred, with UV light up to 289 mm wavelength providing energy efficiency and silver recovery as high as 99%. Exposure to daylight also may result in slight silver sulfide precipitation, but at an impractically slow rate.

Useful sources of high energy electrons include: high energy electron accelerators, such as the 300 KV (kilovolt) — 60 ma (milliamperes), 500 KV — 20 ma, and 300 KV — 25 ma accelerators manufactured by High Voltage Engineering Company of Burlington, Mass. and Radiation Dynamics, Inc. of Westbury, N.Y.; the 150 KV — 10 ma accelerator manufactured by Energy Sciences, Inc., Burlington, Mass.; and accelerators made by various other companies. Useful sources of high intensity UV radiation include high energy mercury vapor lamps, such as the Hanovia 200 watts/inch UV lamp, which produces radiation of which about 30% is in the UV range below 375 nm.

The rate of formation of silver salt precipitate varies depending on the type of radiation, the concentration of silver in the solution, the depth of the solution, and the dose level of the radiation.

Techniques known to those skilled in this art may be employed to convert the silver salt compound to metallic silver, one such technique being smelting the silver salt into free silver metal.

Various methods of passing the silver compound-containing solution through the radiation field can be used. A simple method is to place the solution in a container and pass the container through the radiation field. Examples of other methods are passing a continuously falling film of the solution through the radiation field, passing a spray mist continuously through the field, continuously recirculating an unconfined pool or a confined stream of the solution through the field. Tubing which is transparent to the particular radiation should be used with a confined stream. A circular UV lamp may be used, with the solution being passed through the center of the lamp. When using UV irradiation the tubing should be of quartz glass, borosilicate glass, or a clear plastic which transmits UV light.

THE DRAWINGS

In the drawings, various ways for performing the invention are shown schematically:

THE PREFERRED EMBODIMENTS

EXAMPLE 1

Figure 1:
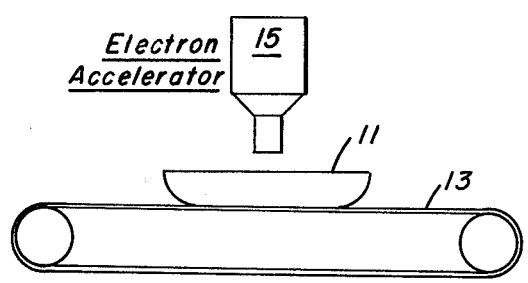
FIG. 1 shows how a shallow pool of solution is passed under a linear accelerator.

Referring to FIG. 1, 200 grams of spent sodium thiosulfate photographic fix solution having a pH of 4.2, containing 1 gm $Ag^+$/liter in complex form, were placed in a white porcelain tray 11 measuring 19.2×9.2×5 cm, without addition of alkali to modify the pH. Using a conveyor belt 13, the tray was passed under an electron beam from a 300 KV - 60 ma accelerator 15 made by the High Voltage Engineering Company of Burlington, Mass., so as to be subjected to a dosage of 10 Mrad. In less than 1 second a flaky black precipitate formed. The precipitate was filtered, washed twice with distilled water, and dried at 90° C for 8 hours. The precipitate was identified as mostly silver sulfide with some trace amounts of halides and metals. Silver recovery was 91.4% as determined from the amounts of silver in the precipitate and remaining in the supernatant solution, the amount in the supernatant solution being obtained by evaporating the solution at 95° C.

EXAMPLE 2

The experiment was repeated, using the electron beam from a 550 KV - 20 ma accelerator made by the High Voltage Engineering Corp. of Burlington, Mass., for treating spent sodium thiosulfuate fix solution containing 5 gm $Ag^+$/liter in complex form, the solution being subjected to a 4 Mrad dosage. Again, a flaky black precipitate was obtained in less than 1 second and identified as mainly silver sulfide. Silver recovery wa 82.7%.

EXAMPLE 3

Figure 2:
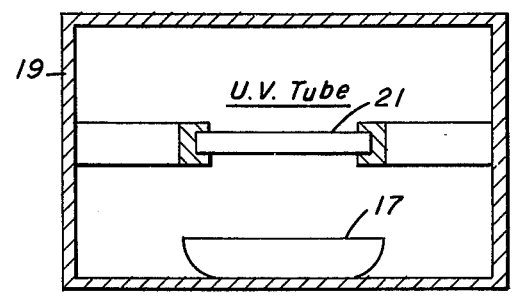
FIG. 2 shows how a shallow pool is treated by ultraviolet light while stationary.

Referring to FIG. 2, 200 grams of spent sodium thiosulfate photographic fix solution containing 1 gm $Ag^+$/liter in complex form and having a pH of about 5.7 was placed in a white porcelain tray 17 measuring 19.2×9.2×5 cm without addition of alkali to modify the pH. The tray was placed in a laboratory oven 19 containing a 68 watts/inch General Electric UVIARC UA-11 UV lamp 21, such that the distance between the surface of the solution and the lamp was 3.25 inches. The sample was irradiated, and a precipitate of large black flakes resulted. This precipitate was filtered, washed twice with distilled water, and dried. X-ray diffraction analysis identified the precipitate as primarily silver sulfide. Silver recovery was 97.5%.

EXAMPLE 4

Figure 9:
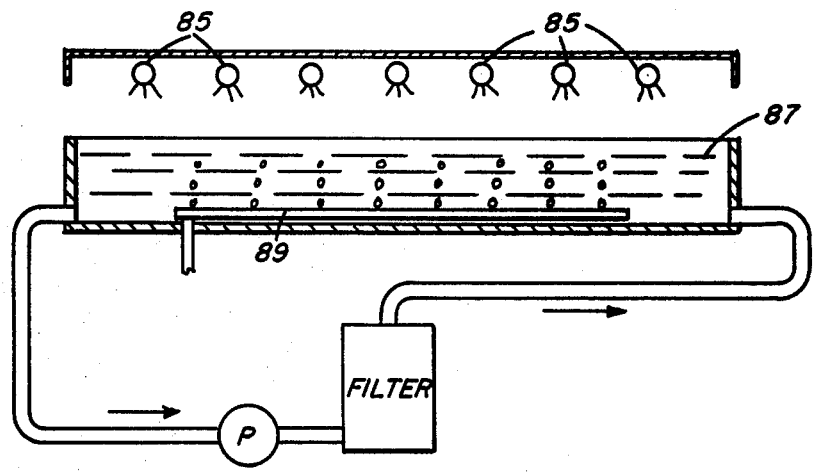
FIG. 9 shows apparatus for irradiating a flowing pool of solution while bubbling air through the pool.

Silver was recovered from 10 liters of Kodak Graphic Arts waste fix solution having a pH of 5.0 using an apparatus shown in FIG. 9. Concentration of the waste fix as received was 0.45 gm $Ag^+$/liter. Silver in this solution was present as a soluble silver thiosulfate complex. The solution was diluted with water (without adding any alkaline material) and then passed beneath seven 15 watt germicidal UV lamps made by GTE Sylvania Inc. Lamps were 8 inches above the bottom of the pan. Solution depth was 5 inches (surface to lamp distance is 3 inches). The waste fix solution was pumped into one end of the pan and flowed beneath the lamps to the opposite side of the pan. Air bubbling was used to increase agitation and exposure of the solution to UV since penetration with this type of lamp is rather low. As the solution was exposed to the UV radiation insoluble particles of $Ag_2S$ formed. The slurry of waste fix and suspended particles of $Ag_2S$ was pumped at a rate of 3 liters/minute through a 3 $\mu$ filter core to remove the $Ag_2S$. After recirculation for 5 hours the concentration of $Ag^+$ remaining in the solution was about 1 ppm.

EXAMPLE 5

Figure 10:
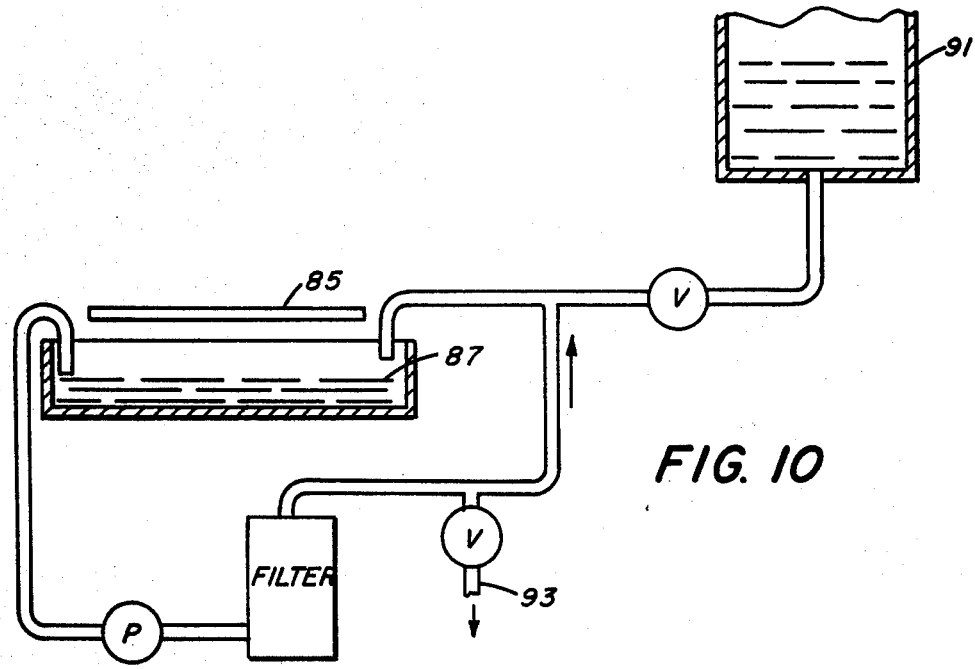
FIG. 10 shows apparatus for irradiating a flowing pool of solution while continuously or periodically replenishing the solution and withdrawing solution which has been depleted of silver compounds.

Silver was recovered from ECN (Eastman Color Negative) waste fix solution having a pH of 5.7 using an apparatus shown in FIG. 10. Concentration of the waste fix as received was 0.25 gm $Ag^+$/liter. Silver in this solution was present as a soluble silver thiosulfate complex. The solution was diluted with water (without adding alkaline material) and then passed beneath a 10 in. long, 300 watt/inch high intensity mercury vapor lamp made by Fusion Systems Corporation. The lamp was 5 inches above the bottom of the pan. Solution depth was 1.5 inches (surface to lamp distance was 3.5 inches). The waste fix solution was pumped into one end of the pan and flowed beneath the lamp to the opposite side of the pan. As the solution was exposed to the UV radiation insoluble particles of $Ag_2S$ formed. The slurry of waste fix and suspended particles of $Ag_2S$ was pumped at a rate of 1 liter/minute through a 3 $\mu$ filter core to remove the $Ag_2S$. At this flow rate the effluent contained <1 ppm $Ag^+$ indicating essentially complete silver recovery.

With this particular equipment 1 liter/minute is the maximum flow rate for complete recovery of silver in a single pass. However, complete recovery at rates above 1 liter/minute can be achieved in a batch process by recirculating the effluent back to the reservoir and passing it through the system until complete recovery is obtained.

EXAMPLE 6

The percent light absorption of a simulated spent sodium thiosulfate fix solution contain 2 grams of added AgBr/liter and having a pH of about 5.7 was measured using a Beckman DU UV spectrophotometer. The results are listed in Table I. The simulated spent thiosulfate fix solution was also irradiated in front of a 500 watt incandescent (projector) lamp, which produced radiation having a wavelength of 380 to 780, nm, for 1 hour. No color change or precipitate formation was observed. The same solution, without alkali addition, was then irradiated under a GE UA-11 lamp, which produced radiation having a wavelength of 220 to 400 nm, resulting in the formation of a flaky black precipitate which contained approximately 99% of the silver in the fix solution.

Table I

| Comparison of Wavelength and Light Transmission in Spent Fix Solution | |
|---|---|
| Wave Length (nm) | Light Transmission,* (%) |
| 250 | 0 |
| 275 | 0 |
| 300 | 0 |
| 325 | 0 |
| 350 | 71.5 |
| 375 | 100 |
| 400 | 100 |

*A value of 0 indicates light at this wavelength is being totally absorped by the fix solution and producing maximum effect on the solution. Conversely, a value of 100 indicates light is passing through solution without producing any apparent effect.

EXAMPLE 7

Various weights of similar simulated spent sodium thiosulfate fix solution, i.e., 25, 50, 75, and 100 gm containing 2 grams of added AgBr/liter, were poured into a 19.2×9.2×5 cm porcelain trays to form samples having different solution depths (50, 100, 150, and 200 mils, respectively). Solutions, without addition of alkali to modify the pH, were irradiated under a GE UA-11 lamp, (68 watts/inch). About 63% of the radiation was in the ultraviolet range.

Table II

| Depth of Solution (mils) | Radiation Time (minutes) | Ag Recovery (%) |
| --- | --- | --- |
| 50 | 2 | 78.2 |
|  | 4 | 90.9 |
|  | 6 | 98.5 |
|  | 8 | 91.2 |
|  | 10 | 94.5 |
|  | 12 | 91.2 |
| 100 | 2 | 12.1 |
|  | 4 | 50.2 |
|  | 6 | 82.1 |
|  | 8 | 99.4 |
|  | 10 | 90.9 |
|  | 12 | 90.9 |
| 150 | 2 | — |
|  | 4 | 32.3 |
|  | 6 | 57.8 |
|  | 8 | 80.0 |
|  | 10 | 90.2 |
|  | 12 | 90.6 |
| 200 | 2 | — |
|  | 4 | 18.1 |
|  | 6 | 51.6 |
|  | 8 | 62.8 |
|  | 10 | 79.5 |
|  | 12 | 86.0 |

EXAMPLE 8

A series of samples of known silver concentrations ranging from 1 to 10 gm AgBr/liter in simulated spent sodium thiosulfate fix solution having a pH of 5.0 were used in pools 2.5 mm deep. Fifty gm of these fix solutions were poured into 19.2×9.2×5 cm porcelain trays, without modifying the pH by alkali addition, and irradiated under a 1200 watt GE UA-11 UV lamp (68 watts/inch) for 2, 4, 6, 8, 10 and 12 minutes without agitation or recirculation. About 63% of the radiation was in the ultraviolet range.

Table III

| Concentration of AgBr (gm/l) | Radiation Time (minutes) | Ag Recovery (%) |
| --- | --- | --- |
| 1 | 2 | 14.5 |
|  | 4 | 63.0 |
|  | 6 | 90.6 |
|  | 7 | 97.8 |
| 2 | 2 | 12.1 |
|  | 4 | 50.2 |
|  | 6 | 82.1 |
|  | 8 | 99.4 |
| 3 | 2 | 9.0 |
|  | 4 | 32.7 |
|  | 6 | 61.9 |
|  | 8 | 75.6 |
|  | 12 | 89.6 |
| 5.0 | 2 | 11.3 |
|  | 4 | 28.3 |
|  | 6 | 51.2 |
|  | 8 | 64.2 |
|  | 10 | 68.8 |
| 7.5 | 2 | 6.7 |
|  | 4 | 29.9 |
|  | 6 | 36.7 |
|  | 12 | 46.4 |
| 10.0 | 2 | 7.2 |
|  | 4 | 17.9 |
|  | 6 | 31.1 |
|  | 10 | 34.5 |

EXAMPLE 9

The effect of solution pH on silver recovery efficiency was determined by adjusting the simulated spent thiosulfate fix solution, which contained 2 gm AgBr/liter, with 1N sulfuric acid or sodium hydroxide using a Sargent pH Meter, Model LS. Various simulated spent fix solutions with different pH were irradiated for 4 minutes under a GE UA-11 UV lamp (68 watts/inch). Solution depth of the quiescent pool was 100 mils. About 63% of the radiation was in the ultraviolet range.

Table IV

| Solution pH | % Silver Recovery |
| --- | --- |
| 3.5 | 32.4 |
| 4.6 | 41.0 |
| 5.0 | 50.2 |
| 6.0 | 55.0 |
| 7.2 | 51.9 |
| 8.0 | 62.6 |
| 9.1 | 66.0 |
| 10.1 | 82.3 |
| 11.1 | 99.5 |

In normal operations the pH of a spent fix will inherently be between about 4.0 and about 9.0 in which range silver recovery was up to about 66.0% in the above example. However, in practice, much greater recoveries are secured by recycle of solution. It is recognized that the above example showed a greater silver recovery at pH of 10.1 and 11.1, but such an operation would require the addition of large amounts of alkali, with the disadvantages previously alluded to.

EXAMPLE 10

In order to compare the ultraviolet treatment of the present invention with the treatment of U.S. Pat. No. 2,221,163 the following experiments were performed under the same conditions except for the differences specified:

A. A spent photographic fix solution having a pH of 5.9 was treated with sodium hydroxide, raising the pH to 10. Then 8 grams/liter of a 10% aqueous solution of tetramethyl ammonium hydroxide were added. After completion of the reaction and recovery of the resulting precipitate, it was found that only 3% of the silver had been recovered.

B. The treated fix of A was irradiated for 6 seconds with ultraviolet radiation at 200 watts/inch. Silver recovery was increased to only 14.5%.

C. The spent fix of A and B having a pH of 5.9 was irradiated for 6 seconds with ultraviolet radiation at 200 watts/inch without adding alkali and tetramethyl ammonium hydroxide. Silver recovery was 30%.

D. Referring to Example 3, 6 minutes of ultraviolet radiation at only 68 watts/inch gave a silver recovery of 97.5%.

The time that the solution must be exposed to radiation will vary depending on the type of radiation used, the concentration of the various components in the solution, the depth of the solution, and the amount of silver to be recovered.

Remarkably and surprisingly, when high energy electron radiation is used, silver can be recovered efficiently from spent fix solution within one second. UV radiation requires more time, but time can be reduced by using higher wattage lamps, or by the use of equipment with multiple lamps.

From the results in Table I, it appears that when using electromagnetic radiation energy, wavelengths of 325 nm or less are preferred for recovery of silver from spent thiosulfate fix solutions. These wavelengths produce a rapid and essentially complete conversion of the soluble silver complex to insoluble silver sulfide. Higher UV wavelengths can also be used, but would require either longer exposure times or higher intensity in order to accomplish the same results.

Silver concentration and solution depth also affect silver recovery by the method of this invention, particularly where UV radiation is utilized. By agitation, filtration of precipitate, and recirculation, the effect of radiation penetration and solution concentration can be reduced since fresh solution is constantly being exposed to the radiation, and recovery of essentially all silver from processing solutions can be realized. Without agitation, solution depth or solution stream diameter should usually not exceed 1½ inches.

With high energy electron radiation, penetration is directly related to accelerator voltage: a 300 KV machine can penetrate 25 mils; a 550 KV machine, 60 mils; and a 2 MV (megavolt) machine, 400 mils. Concentration appears to have little effect on silver recovery, due to the high intensity of the electron radiation. Almost complete recovery of $Ag^+$ is obtained provided solution depth does not exceed the penetrating capability of the machine. Again, agitation, filtration of precipitate, and recirculation of solution will minimize any penetration and solution concentration effects.

The method can be applied to silver compound-containing solutions having a range of pH values between 4 and 9, and predominantly around 5, which values are generally characteristic of used photographic processing solutions containing silver. The radiation method of this invention requires no addition of acid or base.

Figure 3:
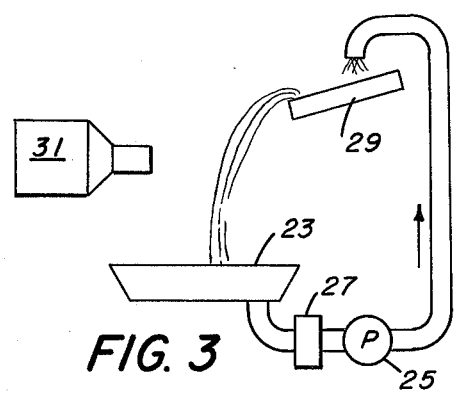
FIG. 3 shows a linear accelerator irradiating a falling film of solution.

In FIG. 3, solution is continuously recirculated from a sump 23 through a filter 27 and a pump 25 to an incline 29 and then drops as a sheet past an electron accelerator 31 into sump 23.

Figure 4:
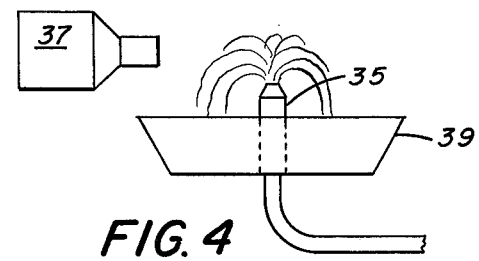
FIG. 4 shows a linear accelerator irradiating a spray mist of solution.

In FIG. 4, solution is sprayed from a nozzle 35 up in front of accelerator 37 and then accumulates in a sump 39 from which it may be recycled to nozzle 35.

Figure 5:
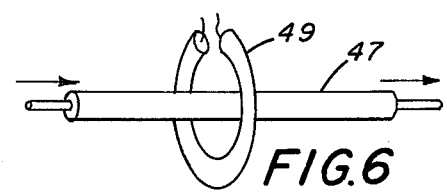
FIG. 5 shows a linear accelerator irradiating a flowing stream of solution.

In FIG. 5, solution is recirculated through a tube 43 located below an accelerator 45.

Figure 6:
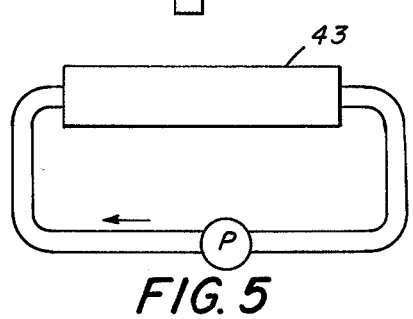
FIG. 6 shows a circular ultraviolet lamp irradiating a flowing stream of solution.

In FIG. 6, solution flows through a tube 47 of quartz glass, or other ultraviolet transmitting material and is irradiated by a surrounding circular ultraviolet lamp 49.

Figure 7:
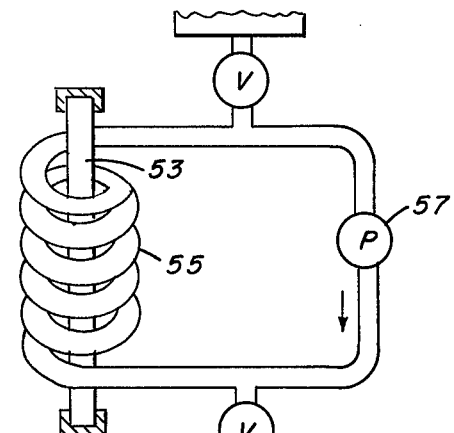
FIG. 7 shows a straight ultraviolet lamp irradiating a stream of solution flowing through coils around the lamp.

In FIG. 7, the ultraviolet lamp 53 is surrounded by coils 55 of ultraviolet transmitting material through which fix solution is recirculated by a pump 57. An inlet 59 and an outlet 61 for solution are provided, controlled by valves for periodically replenishing and bleeding off solution, respectively.

Figure 8:
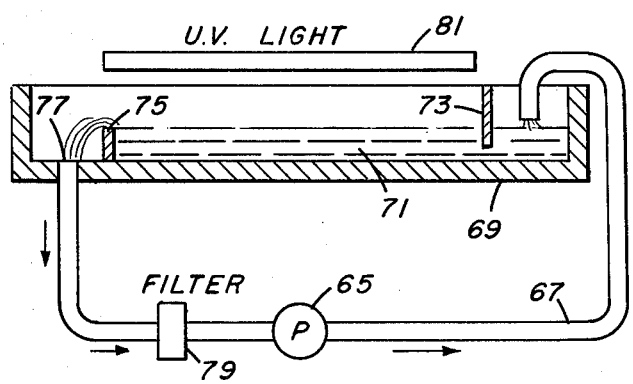
FIG. 8 shows a straight ultraviolet lamp irradiating a flowing pool of solution.

In FIG. 8, solution is pumped by pump 65 through a conduit 67 into one end of a shallow vessel 69 where it flows as a shallow pool 71 under a baffle 73, then over a baffle 75, and out through an outlet 77 into conduit 67, through a filter 79 which removes precipitated silver compounds, and is recycled through pump 65 to the vessel 69. As the shallow pool 71 flows through vessel 69 it is subjected to UV radiation from a UV tube 81.

In FIG. 9 irradiation is by a battery of seven Sylvania UV germicidal lamps 85 as solution circulates in a pool 87. The pool is also agitated by air streams leaving a perforated tube or sparger 89 to improve radiation penetration.

FIG. 10 shows a similar apparatus, with provision for replenishment from a source of fix solution 91 and for removal of depleted solution through conduit 93, both at the same rate.

In the foregoing description we have emphasized the importance of operating at a pH of 4 to 9 without adding acid or alkali to the fix, bleach fix or the like. However, when pollution control is not a factor, or when the cost and complication of adding acid or alkali need not be considered, excellent silver recovery can be obtained even when modifying the solution by adding other chemicals such as acid or alkali. This is particularly true with high energy electron treatment in which the great efficiency and high speed of the reaction may outweigh other factors.

Our invention has been described in abbreviated form in Research Disclosure for June, 1975, page 5.

The invention has been described in detail with particular reference to preferred embodiments thereof, but it will be understood that variations and modifications can be effected within the spirit and scope of the invention.

What is claimed is:

1. A method for rapidly precipitating silver in the form of a silver sulfide precipitate from an aqueous solution containing a silver thiosulfate complex, which method comprises subjecting said solution to radiation having an energy level of at least 4 electronvolts for a time sufficient to form a silver sulfide precipitate.

2. The method in accordance with claim 1 wherein said time is from about 2 to 12 minutes and said silver in said silver sulfide represents from about 75 to 98 weight percent of said silver in said silver thiosulfate.

3. The method in accordance with claim 1 wherein the pH of said aqueous solution is in the range from about 4 to 9.

4. The method in accordance with claim 1 wherein said radiation is in the form of high energy electrons at doses from about 4 to 10 mega rads.

5. The method in accordance with claim 1 wherein said radiation is in the form of electromagnetic radiant energy having wavelengths less than 375 nanometers.

* * * * *